(12) United States Patent
Gephart et al.

(10) Patent No.: US 8,336,837 B2
(45) Date of Patent: Dec. 25, 2012

(54) UNIVERSAL CLAMP ASSEMBLY

(76) Inventors: Joel A. Gephart, Hoschton, GA (US);
Shelly A. Gephart, Hoschton, GA (US)

( * ) Notice: Subject to any disclaimer, the term of this patent is extended or adjusted under 35 U.S.C. 154(b) by 167 days.

(21) Appl. No.: 12/957,448

(22) Filed: Dec. 1, 2010

(65) Prior Publication Data

US 2012/0138760 A1     Jun. 7, 2012

(51) Int. Cl.
*F21V 21/00*     (2006.01)
(52) U.S. Cl. ................... 248/218.4; 248/229.12
(58) Field of Classification Search ........... 248/218.4, 248/219.4, 229.12, 229.22, 226.11, 230.3, 248/231.41, 228.3, 316.4, 74.4, 62, 70
See application file for complete search history.

(56) References Cited

U.S. PATENT DOCUMENTS

| | | |
|---|---|---|
| 3,358,952 A | 12/1967 | Burns |
| 3,530,996 A * | 9/1970 | Schaffer .................. 211/107 |
| 4,270,724 A | 6/1981 | McMullen |
| 4,595,165 A | 6/1986 | Klingensmith |
| 4,903,929 A | 2/1990 | Hoffman |
| 5,313,910 A | 5/1994 | Wittman |
| 5,489,088 A | 2/1996 | Warter |
| 5,857,658 A | 1/1999 | Niemiec |
| 6,237,888 B1 | 5/2001 | Coll |
| 6,557,806 B2 | 5/2003 | Davies |
| 6,581,896 B1 | 6/2003 | Olexovitch |
| 6,715,725 B2 | 4/2004 | Chipka |
| 6,898,893 B1 | 5/2005 | Mukdaprakorn |
| 7,448,590 B1 | 11/2008 | Holton |
| 7,740,216 B1 | 6/2010 | Puckett |
| 2005/0045785 A1 | 3/2005 | Cohen |
| 2006/0255220 A1 | 11/2006 | Skripps |
| 2007/0034758 A1 | 2/2007 | Bates |
| 2011/0147554 A1* | 6/2011 | Liao et al. ............... 248/226.11 |

FOREIGN PATENT DOCUMENTS

DE          19615536      *    4/1996

* cited by examiner

*Primary Examiner* — Ramon Ramirez
(74) *Attorney, Agent, or Firm* — Matthew L. Grell; Balser & Grell IP Law

(57) ABSTRACT

A shaped clamp member having a symmetrical four section bent flat plate configured to fit the round surface of the rod and configured to fit the surface of the square spindle, a shaped abutment member having a symmetrical three section reversible bent flat plate configured to fit round surface of the rod and reversing the second clamp member is configured to fit the surface of the square spindle, and, thus, functions to enable a universal pole clamp able to fit one or more sizes and configurations of deck railing or deck spindle or utilized to support one or more sizes and configurations of poles or round rods.

22 Claims, 5 Drawing Sheets

UNIVERSAL CLAMP ASSEMBLY

TECHNICAL FIELD

The disclosure relates generally to brackets, supports or holders and more specifically it relates to clamps for poles and/or deck rails.

BACKGROUND

Various anchors, brackets, holders, and supports are known in the prior art, for example, there are clamps and clamps for special purposes such as pipe clamps for antennas, chain link fence, and scaffolding. It is known to configure anchors, brackets, holders, and supports, in particular, by using a two piece rigid assemblies drawn together by threaded bolts and nuts.

Homeowners, apartment owners and business owners with exterior decks enclosed with a railing or fence enclosures often are looking for a means to personalize or decorate such space without confiscating the deck foot print or square footage of the deck's floor space. Accordingly, such owners have utilized brackets or clamps to hang pots, bird feeders, umbrellas, lights, torches, and the like. Such brackets or clamps will mount to a horizontal deck/rail board such as a 2×4 inch or 2×6 inch or will mount to a single vertical rail or spindle such as a 1 inch rail or ¼ inch round iron rail. However, such brackets or clamps are not universal in that they cannot be secured to one or more sizes and/or configurations of decking railing or spindle.

Therefore, it is readily apparent that there is a recognizable unmet need for a universal clamp assembly, wherein a single clamp may be configured to fit one or more sizes and configurations of deck railing or deck spindle or utilized to support one or more sizes and configurations of poles.

BRIEF SUMMARY

Briefly described, in example embodiment, the present apparatus overcomes the above-mentioned disadvantage, and meets the recognized need for a universal clamp assembly comprising, in general, a shaped clamp member having a symmetrical four section bent flat plate configured to fit the round surface of the rod and configured to fit the surface of the square spindle, a shaped abutment member having a symmetrical three section reversible bent flat plate configured to fit round surface of the rod and reversing the second clamp member is configured to fit the surface of the square spindle, and, thus, functions to enable a universal pole clamp able to fit one or more sizes and configurations of deck railing or deck spindle or utilized to support one or more sizes and configurations of poles or round rods.

According to its major aspects and broadly stated, the universal clamp assembly comprising, in general, a shaped clamp member having a symmetrical four section bent flat plate wherein one section of the four section bent flat plate is configured to fit the round surface of the rod and two other sections of the four section bent flat plate are configured to fit the surface of the square spindle, a shaped abutment member having a symmetrical three section reversible bent flat plate wherein one section of the three section bent flat plate is configured to fit round surface of the rod and one section of the three section bent flat plate is configured to fit the surface of the square spindle.

In a preferred embodiment, a universal clamp assembly for engagement with a fence having a railing supported by at least one spindle, the assembly comprising: a clamp member having at least one first connector section, at least one first riser section, at least one first mid section, and at least one angular section configured to fit the spindle, a reversible abutment member having at least one second connector section, at least one second riser section, and at least one second mid section configured to fit the spindle, and a plurality of attachment mechanisms, the attachment mechanisms configured to pull the clamp member and the abutment member together to sandwich the spindle therebetween.

In a further exemplary embodiment, a universal clamp assembly for engagement with at least one deck accessory, the assembly comprising: a clamp member having at least one first connector section, at least one first riser section, at least one first mid section, and at least one angular section configured to fit the accessory, a reversible abutment member having at least one second connector section, at least one second riser section, and at least one second mid section configured to fit the accessory, and a plurality of attachment mechanisms, the attachment mechanisms configured to pull the clamp member and the abutment member together to sandwich the accessory therebetween.

In still a further exemplary embodiment of the method of supporting at least one deck accessory comprising the steps of: providing a universal clamp assembly having a clamp member having at least one first connector section, at least one first riser section, at least one first mid section, and at least one angular section configured to fit the spindle, a reversible abutment member having at least one second connector section, at least one second riser section, and at least one second mid section configured to fit the spindle, and a plurality of attachment mechanisms, the attachment mechanisms configured to pull the clamp member and the abutment member together to sandwich the spindle therebetween, identifying the spindle to affix the universal clamp assembly, adjusting the universal clamp assembly to fit the spindle, affixing the universal clamp assembly to the spindle, and supporting a structure therefrom the spindle.

Accordingly, a feature of the universal clamp assembly is its ability to provide a clamp configured to fit one or more sizes and configurations of deck railing or deck spindle or utilized to support one or more sizes and configurations of poles or rods.

Another feature of the universal clamp assembly is its ability to provide a shaped clamp member configured to fit the surface of the round rod.

Still another feature of the universal clamp assembly is its ability to provide a shaped clamp member configured to fit the surface of the square spindle.

Yet another feature of the universal clamp assembly is its ability to provide a shaped clamp member having a reversible bent flat plate configured to fit any one of one or more sizes and configurations of deck railing or deck spindle or alternatively utilized to support one or more sizes and configurations of pole or round rod.

Yet another feature of the universal clamp assembly is its ability to provide a shaped clamp member having a non-reversible bent flat plate configured to fit one or more sizes and configurations of deck railing or deck spindle or alternatively utilized to support one or more sizes and configurations of pole or rods.

Yet another feature of the universal clamp assembly is its ability to provide a shaped abutment member having a reversible bent flat plate configured to fit any one of one or more sizes and configurations of deck railing or deck spindle or alternatively utilized to support one or more sizes and configurations of pole or round rod.

Yet another feature of the universal clamp assembly is its ability to provide a versatile clamp capable of supporting hanging pots, bird feeders, umbrellas, lights, torches, and the like.

Yet another feature of the universal clamp assembly is its ability to provide clamp that does not require any tools to assembly or installation.

Yet another feature of the universal clamp assembly is its ability to provide a clamp for removable support of hang pots, bird feeders, umbrellas, lights, torches, and the like.

Yet another feature of the universal clamp assembly is its ability to quickly configure to accommodate various accessories such as hang pots, bird feeders, umbrellas, lights, torches, and the like.

Yet another feature of the universal clamp assembly is its ability to accommodate different configuration and size poles.

Yet another feature of the universal clamp assembly is its ability to enable quick installation.

These and other features of the universal clamp assembly will become more apparent to one skilled in the art from the following Detailed Description of the Embodiments and Claims when read in light of the accompanying drawing Figures.

BRIEF DESCRIPTION OF THE DRAWINGS

The present universal clamp assembly will be better understood by reading the Detailed Description of the embodiments with reference to the accompanying drawing figures, in which like reference numerals denote similar structure and refer to like elements throughout, and in which.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-5 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Figure 1:
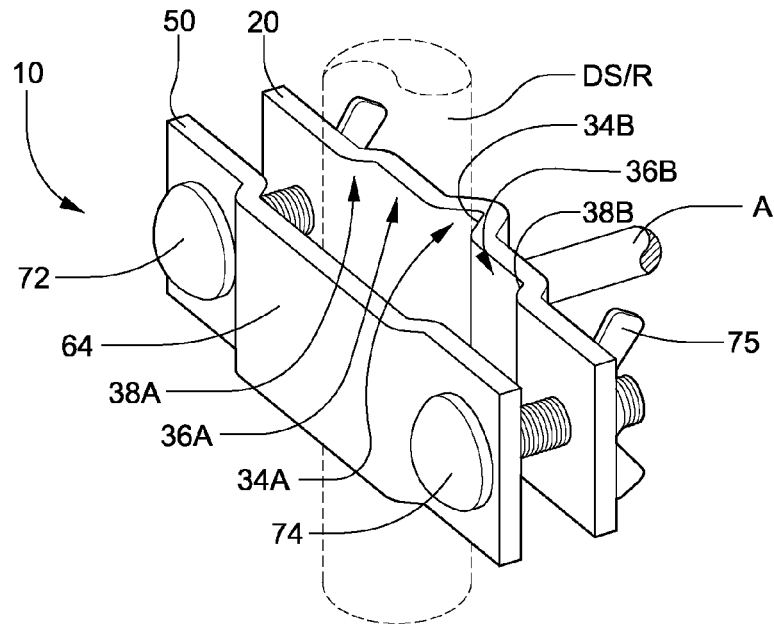
FIG. 1 is a perspective view of an example embodiment of universal clamp assembly.

Referring now to FIG. 1, by way of example, and not limitation, there is illustrated an example embodiment of universal clamp assembly 10. Preferably, universal clamp assembly 10 comprises a shaped clamp such as clamp member 20, a shaped abutment such as abutment member 50, and an attachment mechanism such as a pair of threaded clamping bolts 72, 74. Threaded clamping bolts 72, 74 are preferably used to mount clamp member 20 and abutment member 50 to one or more sizes and configurations of deck railing or deck spindle DS or utilized to support one or more sizes and configurations of poles or round rods R to sandwich deck spindle DS or poles or round rods R (collectively spindles) therebetween and to prevent lateral or vertical motion of universal clamp assembly 10 and its supported item(s). Clamp member 20 and abutment member 50 are preferably provided with spaced apart apertures 32A, 32B and 58A, 58B, (shown in FIG. 2) respectively to receive clamping bolts 72, 74. Clamp member 20 and abutment member 50 are preferably formed of a suitable material, such as steel, iron, rigid plastic or plastic with metal inserts for strength, fiber, metal, aluminum, alloy, stainless steel, or the like, capable of providing structure to universal clamp assembly 10. Preferably, the material includes other suitable characteristics, such as durability, rust-resistance, light weight, heat-resistance, chemical inertness, oxidation resistance, ease of workability, or other beneficial characteristic understood by one skilled in the art.

It is contemplated herein that attachment mechanism may include but is not limited to various threaded bolts, such as threaded carriage bolts, various types of nuts, such as wing nuts, and the like and combinations thereof.

Preferably clamping bolts 72, 74 are preferably formed of a suitable material, such as steel, iron, rigid plastic, fiber, metal, aluminum, alloy, stainless steel, or the like, capable of providing attachment strength to universal clamp assembly 10. Preferably, the material includes other suitable characteristics, such as durability, rust-resistance, light weight, heat-resistance, chemical inertness, oxidation resistance, ease of workability, or other beneficial characteristic understood by one skilled in the art.

It is contemplated herein that spaced apart apertures 32A, 32B and 58A, 58B may be configured and/or sized to accommodate various size, threaded and unthreaded clamping bolts 72, 74 to attach clamp member 20 and abutment member 50 or clamping bolts 72, 74 may be configured to utilize washer and/or nuts to attach clamp member 20 and abutment member 50.

It is contemplated herein that spaced apart apertures 32A, 32B or 58A, 58B may be formed, tapped, or threaded (cutting threads using a tap) to accommodate threaded clamping bolts 72, 74.

Moreover, universal clamp assembly 10 preferably is re-useable, in that assembly 10 may be repeatedly affixed to any one of one or more sizes and configurations of deck railing or deck spindle or alternatively utilized to support one or more sizes and configurations of pole or round rod.

Figure 2:
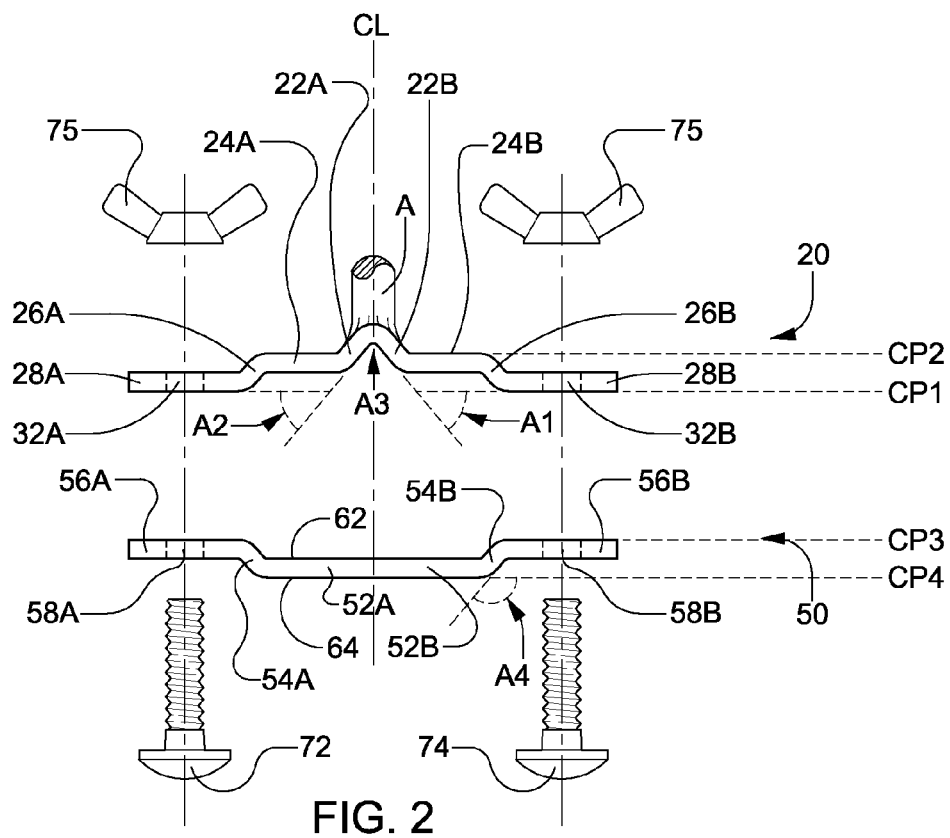
FIG. 2 is a top view of components an example embodiment of universal clamp assembly.

Referring now to FIG. 2, there is illustrated a top view of an example embodiment of universal clamp assembly 10. Specifically, clamp member 20 preferably includes stamped, shaped, bent or formed sections including connector sections 28A, 28B, integral riser sections 26A, 26B, integral mid sections 24A, 24B, and integral curved or angular sections 22A, 22B are formed with apertures or threaded apertures 32A, 32B. Preferably, connector section 28A and connector section 28B extend in a first common plane and mid section 24A and mid section 24B extend in a second common plane. Moreover, first common plane CP1 and second common plane CP2 preferably run parallel or approximately parallel to each other. Therebetween, riser section 26A preferably integrally connects connector section 28A to mid section 24A, and riser section 26A is preferably set at angle or curve A1 such as approximately a forty-five degree angle or similar curve relative to first common plane CP1 or second common plane CP2. Furthermore and therebetween, riser section 26B preferably integrally connects connector section 28B to mid section 24B, and riser section 26B is preferably set at angle or curve A1 such as approximately a forty-five degree angle or similar curve relative to first common plane CP1 or second common plane CP2. Still further, angular sections 22A is preferably integrally connected to mid section 24A, and angular sections 22A is preferably set at angle or curve A2 such as approximately a forty-five degree angle or similar curve relative to first common plane CP1 or second common plane CP2. Likewise, angular section 22B is preferably integrally connected to mid section 24B, and angular section 22B is preferably set at angle or curve A2 approximately a forty-five degree angle or similar curve relative to first common plane CP1 or second common plane CP2. Lastly, angular section 22A and angular section 22B are preferably integrally connected to each other at center line CL to form symmetrical sections of clamp member 20 about center line CL, and angular sections 22A and angular sections 22B are preferably set at angle or curve A3 approximately a ninety degree angle relative to each other.

It is contemplated herein that sections or integral sections of clamp member 20 may include various configurations, number of, angles, curves and sizes and such sections may be arranged proximate one another to fit one or more sizes and configurations of deck railing, deck spindle DS or utilized to support one or more sizes and configurations of poles or rods R.

Preferably, abutment member 50 includes stamped, shaped, bent or formed sections including connector sections 56A, 56B, integral riser sections 54A, 54B, and integral mid sections 52A, 52B, and connector sections 56A, 56B are formed with apertures 58A, 58B. Preferably, connector section 56A and connector section 56B extend in a third common plan CP3 and mid section 52A and mid section 52B extend in a fourth common plane CP4. Moreover, third common plane CP3 and fourth common plane CP4 preferably run parallel to each other. Therebetween, riser sections 54A preferably integrally connects connector section 56A to mid section 52A, and riser sections 54A is preferably set at angle or curve A4 approximately a one-hundred and thirty degree curve or angle A3 relative to third common plane CP3 or to third common plane CP4. Furthermore and therebetween, riser sections 54B preferably integrally connects connector section 56B to mid section 54B, is preferably set at angle or curve A4 approximately a one-hundred and thirty degree curve or angle A3 relative to third common plane CP3 or to third common plane CP4. Lastly, mid section 52A and mid section 52B are preferably connected to each other at center line CL to form symmetrical sections of abutment member 50 about center line CL, and mid section 52A and mid section 52B are preferably formed along fourth common plane CP4.

It is contemplated herein that sections or integral sections of abutment member 50 may include various configurations and sizes and such sections may be arranged proximate one another to fit and reversibly fit one or more sizes and configurations of deck railing, deck spindle or utilized to support one or more sizes and configurations of poles or rods.

Preferably, aperture 58B in connector section 56B of abutment member 50 is configured to receive carriage bolt 74 and carriage bolt 74 further is passed through similarly spaced hole 32B of connector section 28B of clamp member 20 and fitted with matching wing nut 75. Likewise, aperture 58A in connector section 56A of abutment member 50 is configured to receive carriage bolt 72 and carriage bolt 72 further is passed through similarly spaced hole 32A of connector section 28A of clamp member 20 and fitted with matching wing nut 75.

Alternatively, aperture 58B in connector section 56B of abutment member 50 is configured to receive clamping bolt 74 and clamping bolt 74 further is threaded into similarly spaced threaded hole 32B of connector section 28B of clamp member 20. Likewise, aperture 58A in connector section 56A of abutment member 50 is configured to receive clamping bolt 72 and clamping bolt 72 further is threaded into similarly spaced threaded hole 32A of connector section 28A of clamp member 20.

It is contemplated herein that clamping bolts 72, 74 may be used in a reverse direction by having threaded holes 32A, 32B positioned in connector section 56A, 56B of abutment member 50 and having apertures 58A, 58B positioned in connector section 32A, 32B of clamp member 20.

It is further contemplated herein that threaded holes 32A, 32B and apertures 58A, 58B may be formed without threading and are configured to receive clamping bolts 72, in either direction. Clamping bolts 72, 74 may be provided with washers and nuts.

Figure 3A:
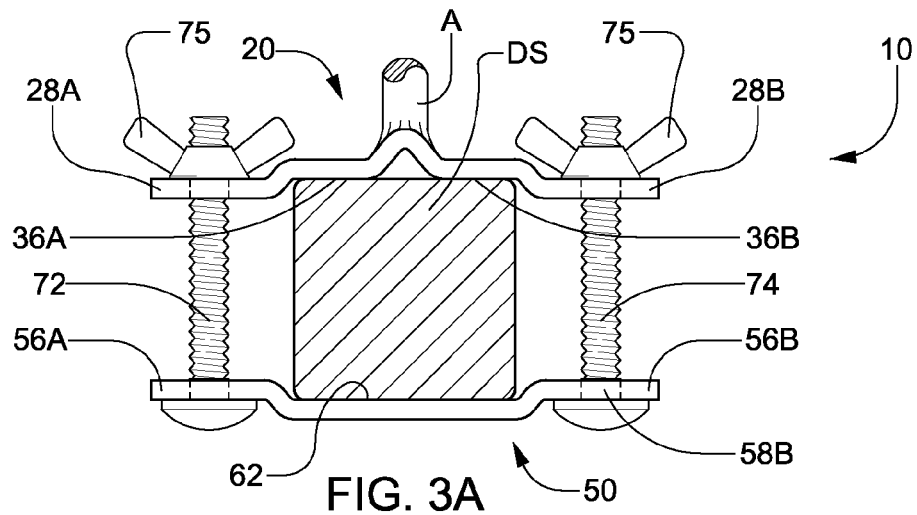
FIG. 3A is a top component view of an example embodiment of universal clamp assembly secured to an exemplary wood spindle.

Referring now to FIG. 3A, there is illustrated a top view of an example embodiment of universal clamp assembly affixed to an exemplary metal or wood spindle. Preferably, clamping bolts 72, 74 are rotatably inserted in holes 32A, 32B and apertures 58A, 58B and fastened with wing nut 75 to selectively pull connector section 28A, 28B of clamp member 20 relative to connector section 56A, 56B of abutment member 50 to sandwich deck spindle DS therebetween, whereby one of one or more sizes and configurations of deck railing or deck spindle DS may be clamped in three point contact between surface 62 of mid section 52A and mid section 52B of abutment member 50 and surface 36A and 36B of mid section 24A and mid section 24B of clamp member 20 (shown in FIG. 1).

It is contemplated herein that universal clamp assembly 10 may be configured and/or sized to fit one of one or more sizes and configurations of deck railing or deck spindles DS, including, but not limited to square, rectangle and flat spindles.

Figure 3B:
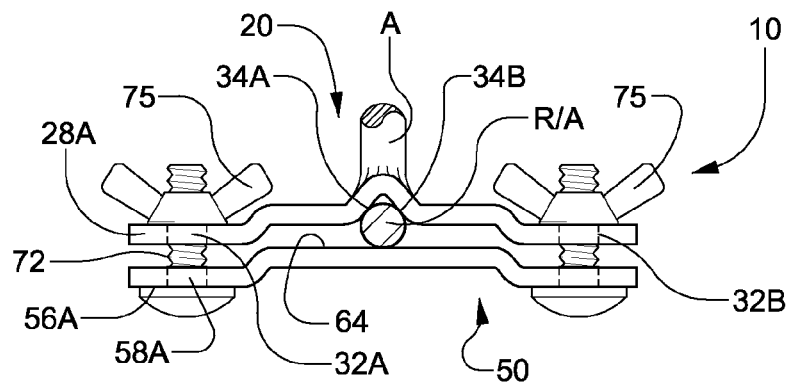
FIG. 3B is a top component view of an example embodiment of universal clamp assembly secured to an exemplary rod.

Referring now to FIG. 3B, there is illustrated a top view of an example embodiment of universal clamp assembly 10 affixed to an exemplary pole or round rod R or accessory A. Preferably, clamping bolts 72, 74 are rotatably inserted in holes 32A, 32B and apertures 58A, 58B and fastened with wing nut 75 to selectively pull connector section 28A, 28B of clamp member 20 relative to connector section 56A, 56B of abutment member 50 to sandwich pole or round rod R therebetween, whereby one of one or more sizes and configurations of pole or round rod R may be clamped in three point contact between surface 64 of reversed abutment member 50 and surfaces 34A and 34B of angular sections 22A and angular sections 22B of clamp member 20 (shown in FIG. 2).

It is contemplated herein that universal clamp assembly 10 may be configured and/or sized to fit one of one or more pole or round rod R deck railing or deck spindles DS, including, but not limited to round rod.

It is contemplated herein that two universal clamp assembly 10 such as FIG. 3A and FIG. 3B may be adjoined via accessory A to form a support affixed to DS and a support for an accessory such as rod R.

Figure 3C:
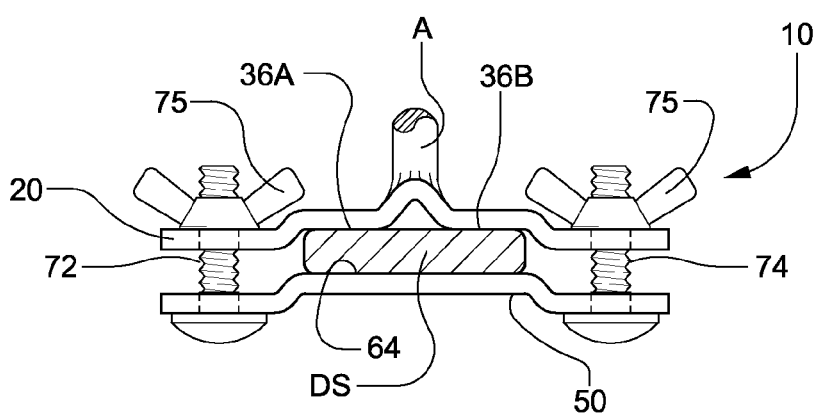

Referring now to FIG. 3C, there is illustrated a top view of an example embodiment of universal clamp assembly affixed to an exemplary wood or metal spindle. Preferably, clamping bolts 72, 74 are rotatably inserted in holes 32A, 32B and apertures 58A, 58B and fastened with wing nut 75 to selectively pull connector section 28A, 28B of clamp member 20 relative to connector section 56A, 56B of abutment member 50 to sandwich exemplary metal or wood spindle therebetween, whereby one of one or more sizes and configurations of metal or wood spindle DS may be clamped in three point contact between surface 64 of reversed abutment member 50 and surface 36A and 36B of mid section 24A and mid section 24B of clamp member 20 (shown in FIG. 1).

It is contemplated herein that universal clamp assembly 10 may be configured and/or sized to fit one of one or more sizes and configurations of deck railing or deck spindles DS, including, but not limited to square, rectangle and flat spindles.

Figures 4A, 4B, 4C:
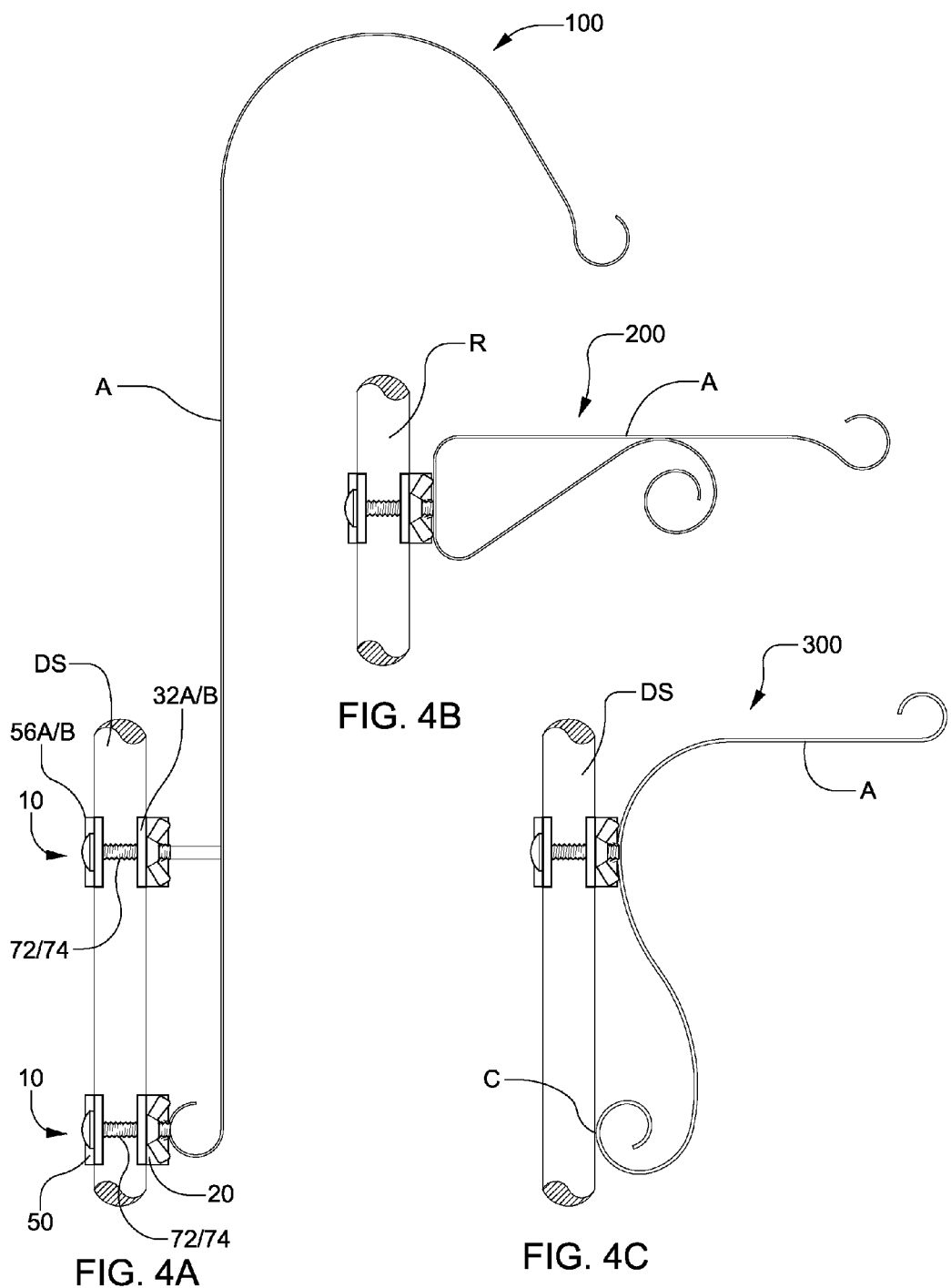
FIG. 4 is side views of an example embodiment of universal clamp assembly shown securing or supporting various items.

Referring now to FIG. 4A, there is illustrated a side view of an example embodiment of two universal clamp assembly 10 affixed to an exemplary spindle DS in separated positions to support accessories such as hooks, rail hooks, hangers, rings, hanging pots, bird feeders, umbrellas, lights, torches, shepherds hooks, and the like A. Specifically, moveable hanger assembly 100 utilizes universal clamp assembly 10 to removably affix moveable hanger assembly 100 to deck spindle DS. Moreover wing nut 75 may be reverse rotated from clamping bolts 72, 74 to selectively loosen connector section 32A, 32B of clamp member 20 relative to connector section 56A, 56B of abutment member 50 to enable universal clamp assembly 10 to be repositioned relative to deck spindle DS.

Referring now to FIG. 4B, there is illustrated a side view of an example embodiment of universal clamp assembly 10 affixed to an exemplary pole or round rod R to support accessories such as hooks, rail hooks, hangers, rings, hanging pots, bird feeders, umbrellas, lights, torches, shepherds hooks, and the like A. Specifically, moveable hanger assembly 200 utilizes universal clamp assembly 10 to removably affix moveable hanger assembly 200 to rod R. Moreover wing nut 75 may be reverse rotated from clamping bolts 72, 74 to selectively loosen connector section 32A, 32B of clamp member 20 relative to connector section 56A, 56B of abutment member 50 to enable universal clamp assembly 10 to be repositioned relative to rod R.

Referring now to FIG. 4C, there is illustrated a side view of an example embodiment of two universal clamp assembly 10 affixed to an exemplary spindle DS to support accessories such as hooks, rail hooks, hangers, rings, hanging pots, bird feeders, umbrellas, lights, torches, shepherds hooks, and the like A. Specifically, moveable hanger assembly 300 utilizes universal clamp assembly 10 to removably affix moveable hanger assembly 300 to deck spindle DS. Moreover wing nut 75 may be reverse rotated from clamping bolts 72, 74 to selectively loosen connector section 32A, 32B of clamp member 20 relative to connector section 56A, 56B of abutment member 50 to enable universal clamp assembly 10 to be repositioned relative to deck spindle DS. In addition, accessory A may include one or more contact points C to provide addition support for accessory A.

Figure 4D:
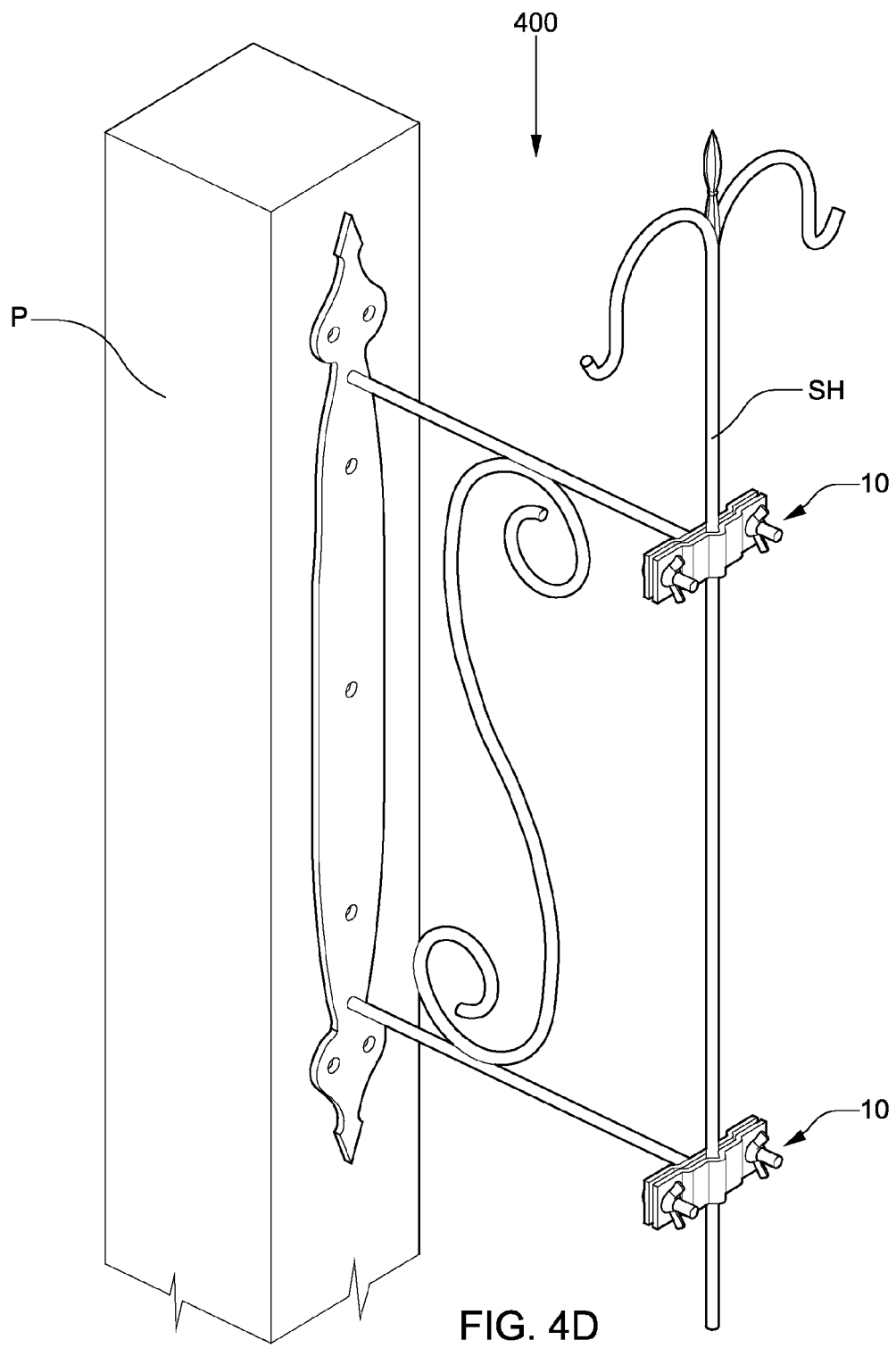

Referring now to FIG. 4D, there is illustrated a side view of an example embodiment of one or more universal pole clamp assemblies 10 affixed to hanger assembly 400. Preferably, hanger assembly 400 may be affixed to decking post P. Specifically, hanger assembly 400 utilizes two or more universal clamp assemblies 10 to removably support hooks, rail hooks, hangers, rings, hanging pots, bird feeders, umbrellas, lights, torches, shepherds hooks, and the like. Moreover wing nut 75 may be reverse rotated from clamping bolts 72, 74 to selectively loosen connector section 32A, 32B of clamp member 20 relative to connector section 56A, 56B of abutment member 50 to enable universal clamp assembly 10 to reposition, for example, the shepherds hook SH relative to post P. It is contemplated herein that hanger assembly 400 may be adjoined via accessory A to form a support affixed to post P and a support for an accessory such as shepherds hook S.

It is contemplated herein that universal clamp assemblies 10 may be utilized to removeably support a structure such as hanging pots, bird feeders, umbrellas, lights, torches, and the like.

Figure 5:
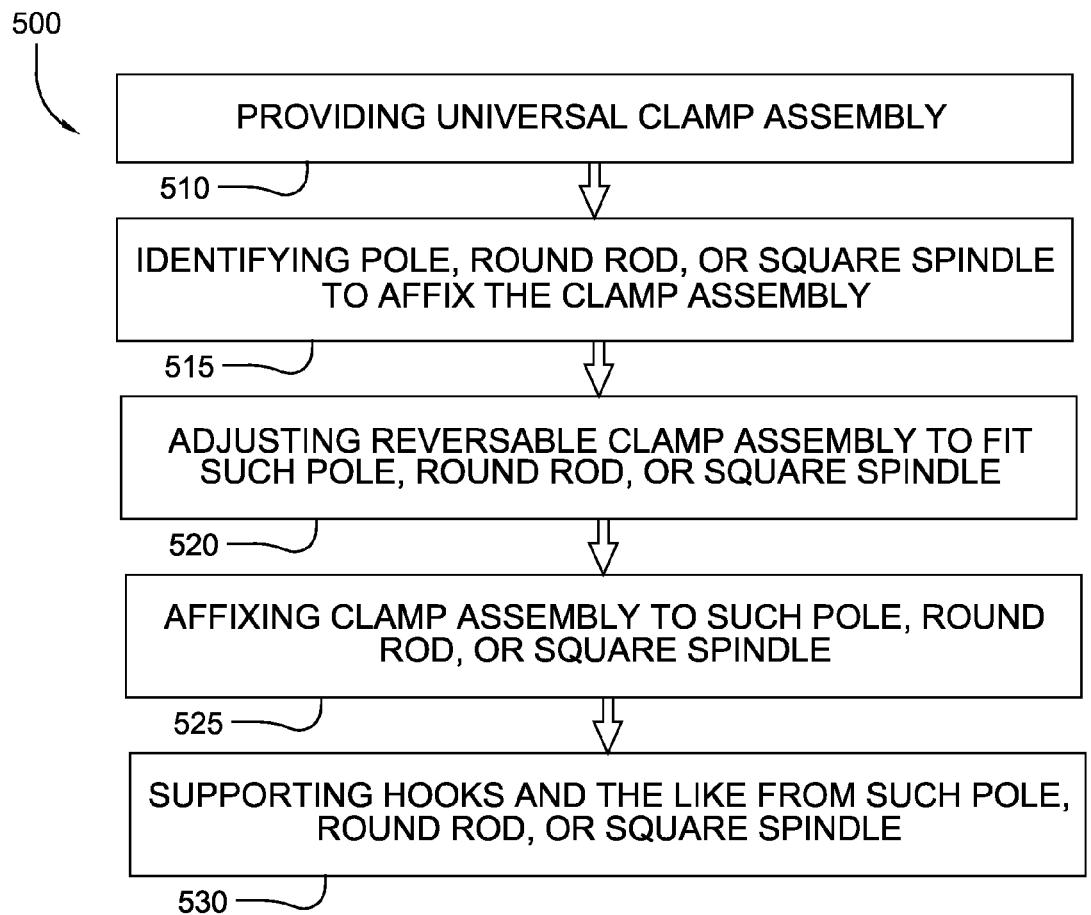
FIG. 5 is a flow diagram of a method of securing a deck ornament.

Referring now to FIG. 5, there is illustrated a flow diagram 500 of a method for attaching a decorative item to a deck. In block or step 510, providing universal clamp assembly 10, which comprises a shaped clamp such as clamp member 20, a shaped abutment such as abutment member 50, and an attachment mechanism such as a pair of threaded clamping bolts 72, 74, as described above in FIGS. 1 and 2. In block or step 515, identifying the pole, round rod, or square spindle to affix or attach the universal clamp assembly 10. In block or step 520, adjusting reversible universal clamp assembly 10 to fit such pole, round rod, or square spindle. In block or step 525, affixing reversible universal clamp assembly 10 to such pole, round rod, or square spindle. In block or step 530, supporting hooks, rail hooks, hangers, rings, hanging pots, bird feeders, umbrellas, lights, torches, shepherds hooks, and the like from such pole, round rod R, or square spindle DS.

The foregoing description and drawings comprise illustrative embodiments of the present invention. Having thus described exemplary embodiments, it should be noted by those ordinarily skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one ordinarily skilled in the art to which this invention pertains having the benefit of the teachings presented in the foregoing descriptions and the associated drawings. Although specific terms may be employed herein, they are used in a generic and descriptive sense only and not for purposes of limitation. Moreover, the present invention has been described in detail; it should be understood that various changes, substitutions and alterations can be made thereto without departing from the spirit and scope of the invention as defined by the appended claims. Accordingly, the present invention is not limited to the specific embodiments illustrated herein, but is limited only by the following claims.

What is claimed is:

1. A universal clamp assembly for engagement with a fence having a railing supported by at least one spindle, the assembly comprising:
   a clamp member having at least one first connector section, at least one first riser section, at least one first mid section, and at least one angular section configured to fit the spindle;
   a reversible abutment member having at least one second connector section, at least one second riser section, and at least one second mid section configured to fit the spindle; and
   a plurality of attachment mechanisms, said attachment mechanisms configured to pull said clamp member and said abutment member together to sandwich the spindle therebetween.

2. The universal clamp assembly of claim 1, wherein said clamp member is configured to fit a plurality of spindle.

3. The universal clamp assembly of claim 1, wherein said abutment member is configured to fit a plurality of spindle.

4. The universal clamp assembly of claim 1, wherein said abutment member is reversible.

5. The universal clamp assembly of claim 1, wherein said first connector of said clamp member and said second connector of said abutment member comprises at least one aperture therein configured to receive one of said plurality of attachment mechanisms.

6. The universal clamp assembly of claim 5, wherein said attachment mechanisms further comprises a threaded bolt and said at least one aperture comprises a thread aperture configured to accommodate said threaded bolt.

7. The universal clamp assembly of claim 5, wherein said attachment mechanisms comprise a threaded bolt and a nut, wherein said aperture is configured to accommodate said threaded bolt and said nut.

8. The universal clamp assembly of claim 5, wherein said aperture is configured to accommodate said attachment mechanisms.

9. The universal clamp assembly of claim 1, wherein said attachment mechanisms is selected from the group consisting of various threaded bolts, various nuts, and various washers and combinations thereof.

10. The universal clamp assembly of claim 1, wherein said clamp assembly is configured to removeably support a structure selected from the group consisting of hanging pots, bird feeders, umbrellas, lights, and torches.

11. A universal clamp assembly for engagement with at least one deck accessory, the assembly comprising:
  a clamp member having at least one first connector section, at least one first riser section, at least one first mid section, and at least one angular section configured to fit the accessory;
  a reversible abutment member having at least one second connector section, at least one second riser section, and at least one second mid section configured to fit the accessory; and
  a plurality of attachment mechanisms, said attachment mechanisms configured to pull said clamp member and said abutment member together to sandwich the accessory therebetween.

12. The universal clamp assembly of claim 11, wherein said clamp member is configured to fit a plurality of accessory.

13. The universal clamp assembly of claim 11, wherein said abutment member is configured to fit a plurality of accessory.

14. The universal clamp assembly of claim 11, wherein said abutment member is reversible.

15. The universal clamp assembly of claim 11, wherein said first connector of said clamp member and said second connector of said abutment member comprises at least one aperture therein configured to receive one of said plurality of attachment mechanisms.

16. The universal clamp assembly of claim 15, wherein said attachment mechanisms further comprises a threaded bolt and said at least one aperture comprises a thread aperture configured to accommodate said threaded bolt.

17. The universal clamp assembly of claim 15, wherein said attachment mechanisms comprise a threaded bolt and a nut, wherein said aperture is configured to accommodate said threaded bolt and said nut.

18. The universal clamp assembly of claim 15, wherein said aperture is configured to accommodate said attachment mechanisms.

19. The universal clamp assembly of claim 11, wherein said attachment mechanisms is selected from the group consisting of various threaded bolts, various nuts, and various washers and combinations thereof.

20. The universal clamp assembly of claim 11, wherein said accessory is selected from the group consisting of hanging pots, bird feeders, umbrellas, lights, torches, and the like.

21. A method of supporting at least one deck accessory comprising the steps of:
  providing a universal clamp assembly having a clamp member having at least one first connector section, at least one first riser section, at least one first mid section, and at least one angular section configured to fit the spindle, a reversible abutment member having at least one second connector section, at least one second riser section, and at least one second mid section configured to fit the spindle, and a plurality of attachment mechanisms, said attachment mechanisms configured to pull said clamp member and said abutment member together to sandwich the spindle therebetween;
  identifying the spindle to affix the universal clamp assembly;
  adjusting the universal clamp assembly to fit the spindle;
  affixing the universal clamp assembly to the spindle; and
  supporting a structure therefrom said spindle.

22. The A method of supporting at least one deck accessory of claim 21, said structure is selected from the group consisting of hanging pots, bird feeders, umbrellas, lights, and torches.

* * * * *